April 15, 1924.
J. CALDWELL
1,490,507
COMBINED BUMPER AND SHOCK ABSORBER
Filed Aug. 31, 1923    2 Sheets-Sheet 1
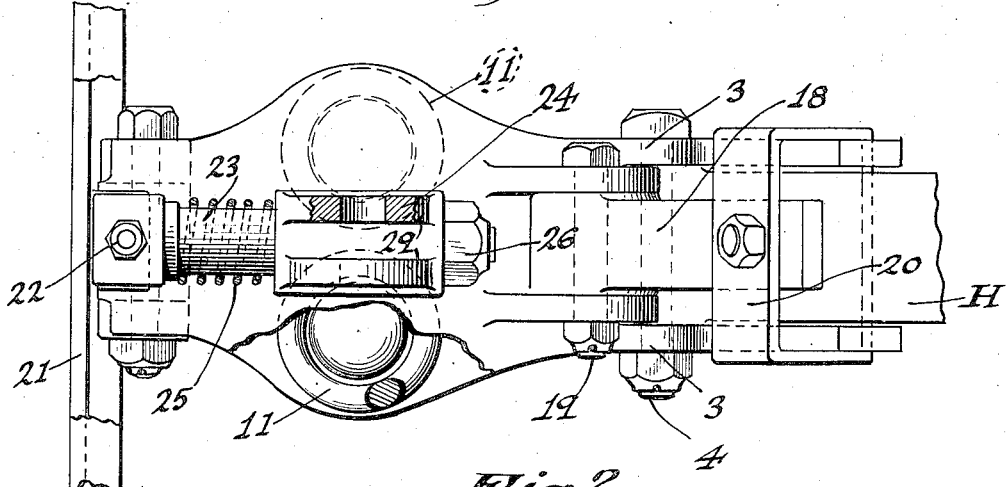
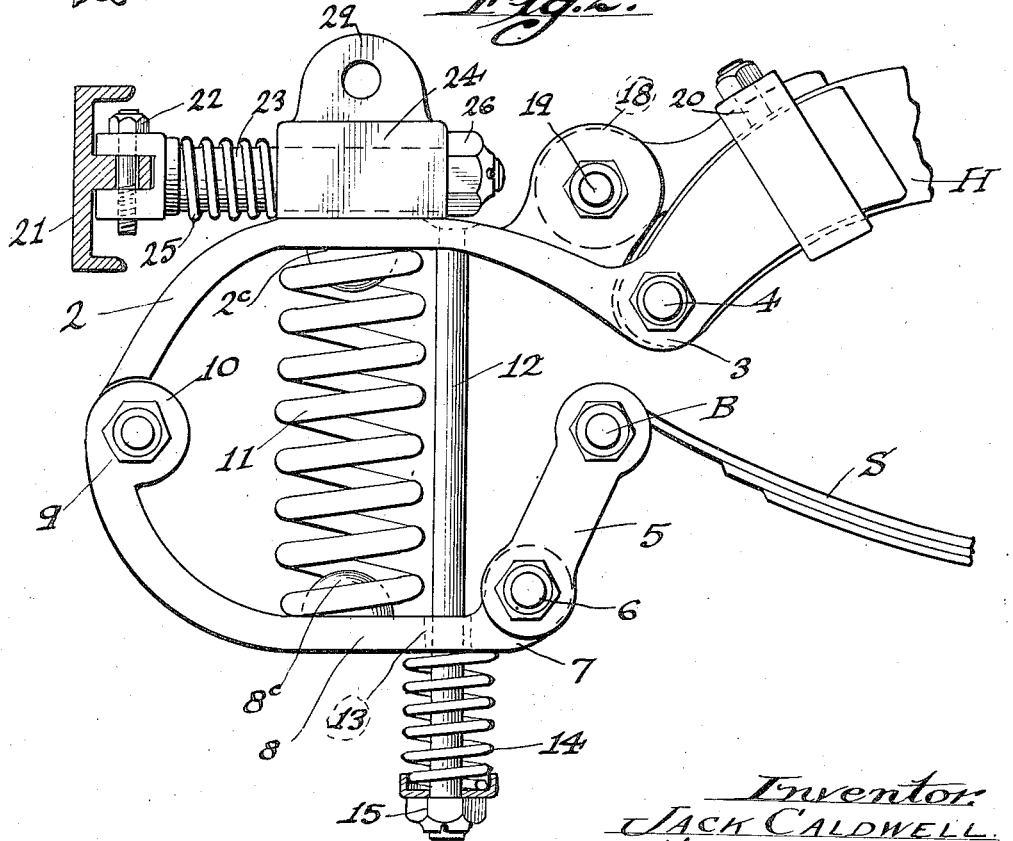

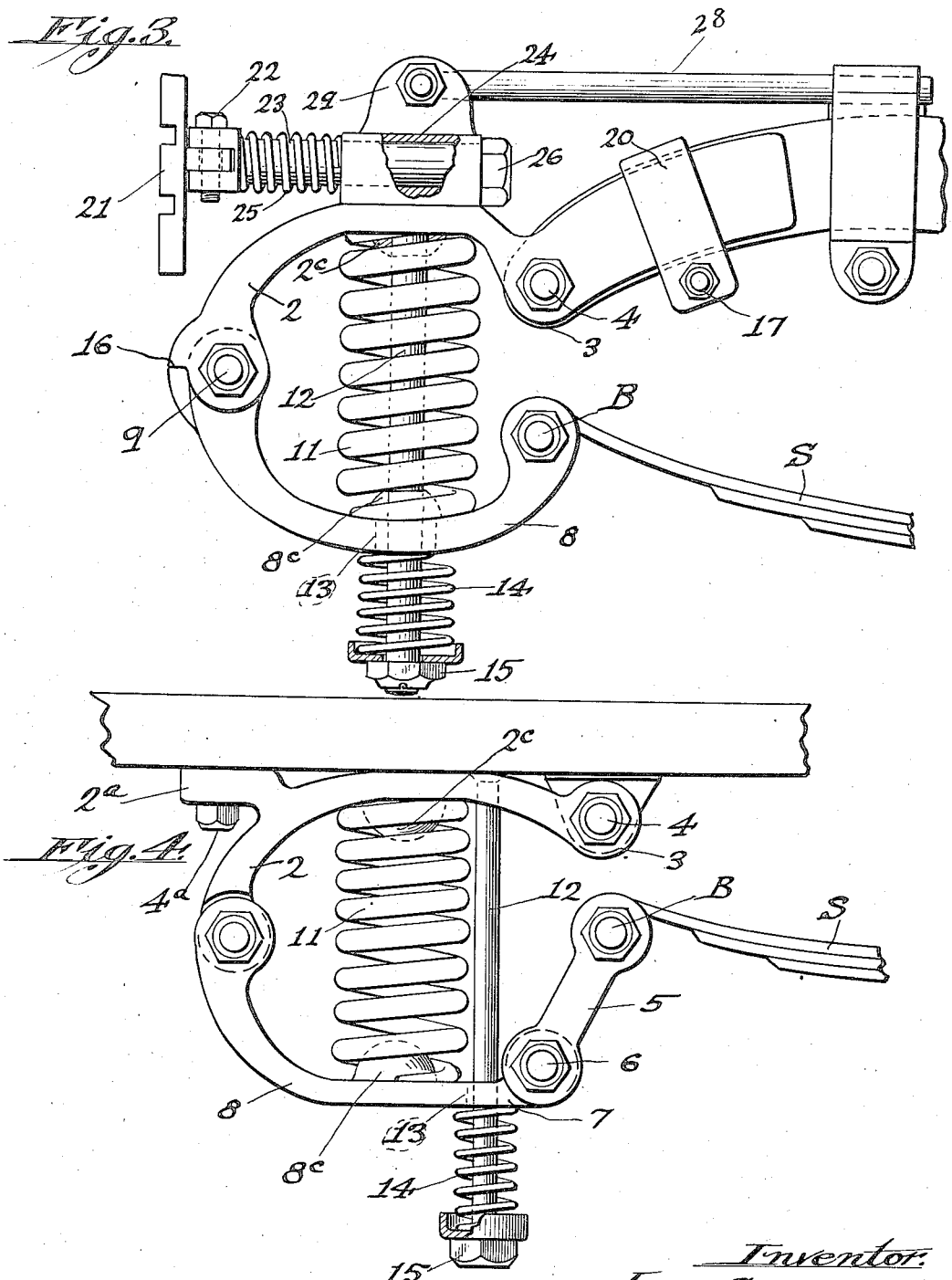

Patented Apr. 15, 1924.

1,490,507

UNITED STATES PATENT OFFICE.

JACK CALDWELL, OF LOS ANGELES, CALIFORNIA, ASSIGNOR OF ONE-HALF TO OSCAR W. GODING AND LILLIAN H. GODING, BOTH OF LONG BEACH, CALIFORNIA.

COMBINED BUMPER AND SHOCK ABSORBER.

Application filed August 31, 1923. Serial No. 660,355.

*To all whom it may concern:*

Be it known that I, JACK CALDWELL, a citizen of the United States, residing at Los Angeles, in the county of Los Angeles and State of California, have invented new and useful Improvements in a Combined Bumper and Shock Absorber, of which the following is a specification.

This invention relates to vehicle springs. An object of the invention is to provide a combined shock absorber and yielding bumper.

Another object of the invention is to provide a shock absorber having a compensating connection with a vehicle spring structure.

Another object is to provide a shock absorber including a mounting part adapted to be rigidly attached to a portion of a vehicle frame.

Another object of the invention is to provide a shock absorber including a movable member attachable to a vehicle spring and combined with a shock absorbing means including duplex springs in such a manner that there is a compounding movement between certain elements of the shock absorber as to the shock absorbing springs means.

Another object is to provide a tension means for counteracting rebound.

Another object is to provide a shock absorber that may be readily adapted to chassis structures of different details of construction.

Other objects and advantages will be made manifest in the following specification of embodiments of the invention illustrated in the accompanying drawings, wherein:

Figure 1 is a plan, and Figure 2 is a side elevation, of one form of the device and showing a compensating shackle.

Fig. 3 is a side elevation of a slightly modified form of the shock absorber and bumper which is provided with a positive rebound lock joint.

Fig. 4 is a side elevation of a form of the bumper as adapted for attachment to a chassis frame and an inner or rear end of a spring.

In Figures 1 and 2 the device comprises a substantial upper bracket part 2, one end of which is provided with spaced bearing eyes 3 to be attached on a head bolt 4 which may be provided in the horn H of a chassis frame, below which is a main spring S provided with a shackle bolt B to receive a shackle link or links 5.

The link 5 is mounted on a bolt 6 provided in a bearing 7, which latter is provided on the swinging end of a substantial lever arm 8, whose opposite end is attached to a pivot bolt 9 provided in bearings 10 in the contiguous end of the rigid bracket 2.

Interposed between the rigid bracket 2 and the lever 8, at a position between the swinging end of the lever and its pivot 9, is a shock absorbing means preferably consisting of duplex springs 11 standing in parallelism between the bracket and the lever arm and reacting against each in a manner to yieldingly transmit downthrust of the frame through the lever 8 and its shackle 5 to the spring S.

Tension means are provided for counteracting rebound action as between the frame and the spring, and such means includes a substantial tension rod or rods 12 attached at the upper end to the bracket 2 and passing through an elongated aperture 13 for each rod in the swinging end of the lever arm 8. The rods 12 project a suitable distance below the brackets and receive compressed springs 14, adjustment of which is provided as by nuts 15 threaded on the lower end of the rods. Upon reaction of the frame of the chassis from the spring S, the yielding tension device comes into play, so that the springs 14 serve to check the recoil as the bracket 2 may relatively move upwardly from the lever arm 8.

By the present construction, it will be seen that there will be a relatively compounded movement as between the swinging end of the lever 8 and the degree of compression of the spring or springs 11 by reason of the relative position of the springs and the swinging ends of the lever as to the pivot 9 of the lever. Upon an excessive movement downwardly of the frame or upwardly of the lever arm, the springs 11 are so compressed that the coils of the same move solidly into abutment and the whole downward thrust is then transmitted to the main spring S.

A somewhat modified form of the device is shown in Figure 3, in which the shackle connection 5 as between the spring S and the lever arm 8 is omitted; the lever arm being attached directly to the bolt B. In this form the tension bolt or bolts 12 are arranged axially within the respective springs 11 and 14. To prevent an undue relative opening of the lever arm 8 and the bracket 2, the connected ends of these parts are provided with a knuckle stop joint 16.

It is understood that various forms of means may be utilized for connecting the bracket 2 to the horn H of the chassis frame, different forms of connections being shown in Figures 2 and 3, these connections being variable according to the different types of frame ends. The connecting parts of the brackets may be fastened as by clamping clips 17 or otherwise. In Figure 2, a clamping leaf 18 is adjustably secured to a bolt 19 in eyes of the bracket 2; this clamping leaf 18 being adapted to rest on the upper part of the horn and be clamped by a clip and bolt shown at 20.

A feature of my invention consists in the connection with a pair of brackets 2 of a vehicle bumper, which includes any suitably shaped cross bar 21 pivotally connected at 22 to a horizontally extending pin 23 slidably mounted in bearing parts 24 provided at the upper part of each of the brackets 2. Between the bearings 24 and the outer ends of the pins 23 are substantial shock absorbing springs 25, which are designed to yield when a blow is struck or pressure is applied to the bumper bar 21. The rear end of the pin 23 is provided with a nut 26 limiting forward movement of the pin in its bearing 24. It will be seen that either end of a bumper bar 21 may be pushed inwardly while the opposite end pivot is in its connecting bolt 21 attaching it to a pin 23.

There may be cases in which it is desirable to reinforce the connection of the shock absorber to a vehicle frame, and this may be accomplished by a brace link 28 which may be attached to ears or lugs 29 forming a part of or attached to the bracket arm 2 and which brace link extends to and is connected with the frame or part H in any suitable manner.

In Figure 4 a form of the device is shown in which the brace 2, instead of being connected to a horn of the frame, is connected to a side member of the frame as by a bolt 4 at one end of the bracket and a cap screw or bolt 4ª at the other end passing through a lug 2ª. In other respects this form of the device is similar to the construction shown in Figure 2, excepting that the bumper parts are omitted; this modification of the shock absorber being adapted for attachment to vehicles which may be already provided with front or rear bumpers.

As seen in Figure 1, the bracket is laterally widened, as is the lever arm 8, so as to provide seats for the ends of the duplex springs 11. An advantage of the duplex system and wide form of construction is that tendency of the device to side-sway is practically overcome.

Centering lugs 2ᶜ and 8ᶜ are provided to receive the ends of the springs and hold the same against dislodgment.

Further embodiments, modifications and variations may be resorted to within the principle of the invention.

What is claimed is:

1. A combined shock absorber and bumper means including a pair of brackets attachable to a vehicle frame and having a resilient connection with the contiguous main springs, a transversely extending bumper bar, said brackets having supports for the transversely extending bumper bar, and a pivotal connection between said supports and the bumper bar, said connection including yielding pins on the outer ends of which the bar is pivotally mounted.

2. A shock absorber for vehicles comprising a bracket member adapted to be rigidly attached to a part of the vehicle frame and extending outwardly, a swinging lever arm pivotally attached to the outer end of the bracket and extending under the brackets attachable to a main spring of the vehicle, and a shock absorbing spring means introduced between the said bracket part and the said lever arm inside of the pivot whereby downward movement of the frame is counteracted by the compression of said spring means.

3. A shock absorber for vehicles comprising a bracket member adapted to be ridigly attached to a part of the vehicle frame, a swinging lever arm pivotally attached to the outer ends of the bracket and attachable to a main spring of the vehicle, and a shock absorbing spring means introduced between the said bracket part and the said lever arm inside of the pivot whereby downward movement of the frame is counteracted by the compression of said spring means, said bracket member and lever arm having a knuckle joint connection to limit separating movement thereof.

4. A shock absorber for vehicles comprising a bracket member adapted to be rigidly attached to a part of the vehicle frame, a swinging lever arm pivotally attached to the outer end of the bracket and attachable to a main spring of the vehicle, a shock absorbing spring means introduced between the said bracket part and the said lever arm whereby downward movement of the frame is counteracted by the compression of said spring means, and a compensating shackle connection between said lever arm and the main spring.

5. A shock absorber for vehicles comprising a bracket member adapted to be rigidly attached to a part of the vehicle frame, a swinging lever arm pivotally attached to the outer end of the bracket and attachable to a main spring of the vehicle, and a shock absorbing spring means introduced between the said bracket part and the said lever arm whereby downward movement of the frame is counteracted by the compression of said spring means, said spring means consisting of duplex springs.

6. A shock absorber for vehicles comprising a bracket member adapted to be rigidly attached to a part of the vehicle frame, a swinging lever arm pivotally attached to the outer end of the bracket and attachable to a main spring of the vehicle, and a shock absorbing spring means introduced between the said bracket part and the said lever arm whereby downward movement of the frame is counteracted by the compression of said spring means, said spring means consisting of duplex springs arranged in parallelism between the bracket member and the lever arm.

7. A shock absorber for vehicles comprising a bracket member adapted to be rigidly attached to a part of the vehicle frame, a swinging lever arm pivotally attached to the outer end of the bracket and attachable to a main spring of the vehicle, a shock absorbing spring means introduced between the said bracket part and the said lever arm whereby downward movement of the frame is counteracted by the compression of said spring means, and a tension connection between the bracket member and the swinging arm.

8. A shock absorber for vehicles comprising a bracket member adapted to be rigidly attached to a part of the vehicle frame, a swinging lever arm attached to the bracket and attachable to a main spring of the vehicle, a shock absorbing spring means introduced between the said bracket part and the said lever arm whereby downward movement of the frame is counteracted by the compression of said spring means, and a tension connection between the bracket member and the swinging arm, said tension connection including a shank attached at one end to the bracket member and passing through the swinging arm and carrying below the arm a spring reacting against the arm.

9. A shock absorber for vehicles comprising a bracket member adapted to be rigidly attached to a part of the vehicle frame, a swinging lever arm attached to the bracket and attachable to a main spring of the vehicle, and a shock absorbing spring means introduced between the said bracket part and the said lever arm whereby downward movement of the frame is counteracted by the compression of said spring means, said spring means being disposed so as to bear upon the swinging arm at a zone between the pivot of the arm and its swinging end to provide for a differential movement as to the swinging end of the lever arm and movement of the spring means when in action.

10. A bumper and shock absorber comprising a bracket member adapted to be rigidly attached to a part of a vehicle frame, and having a horizontal bearing, a pin slidingly mounted in the bearing, a spring upon the pin between a head on the pin and the bearing, and a bumper bar pivotally connected to the head of the pin, a swinging lever arm connected to the bracket and in vertical alignment with the bracket, and a spring inserted between the bracket and the swinging lever arm.

In testimony whereof I have signed my name to this specification.

JACK CALDWELL.